Patented Oct. 2, 1928.

1,686,026

UNITED STATES PATENT OFFICE.

WILHELM NEELMEIER, OF LEVERKUSEN, NEAR COLOGNE-ON-THE-RHINE, AND THEODOR NOCKEN, OF WIESDORF, NEAR COLOGNE-ON-THE-RHINE, GERMANY, ASSIGNORS TO GRASSELLI DYESTUFF CORPORATION, OF NEW YORK, N. Y., A CORPORATION OF DELAWARE.

NAPHTHOPHENAZINE DYESTUFFS.

No Drawing. Application filed June 9, 1926, Serial No. 114,802, and in Germany June 12, 1925.

Our invention consists in novel naphthophenazine dyestuffs from 1-3-di(p-alkoxyarylamino)naphthalenes.

In the German Patents 78,497, 79,189, 80,778, 86,222, 86,223, 86,224, 206,646 and the United States Letters Patent 602,544, 603,013, 606,295 and 940,354 azine dyestuffs and processes of making the same are described which are obtained from 1-3-diaryl-naphthylene diamine sulfonic acids and for which the generally admitted chemical constitution can be represented by the schematic graphical formula

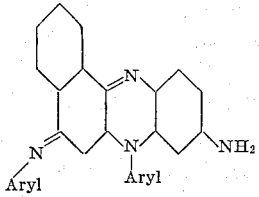

The most important reactions leading to these naphthophenazine dyestuffs are condensation of the 1-3-diaryl-naphthylene-diamine compounds with p-nitroso-amino-aryl compounds or condensation of the same naphthylene diamines with p-amino-azo compounds or joint oxydation of the naphthylene-diamines with para-diamines.

The fastness to light of these dyestuffs is now considerably improved, while the other fastness properties remain practically the same if instead of the di-phenyl or di-tolyl-1-3-naphthylene diamines described so far for these reactions para-alkyloxy-aryl-amino substituted 1-3-naphthylene-diamine compounds are used to produce the naphthophenazine dyestuffs.

The chemical constitution of our novel phenazine dyestuffs obtained in this manner is probably quite similar and can be represented by the schematic formula

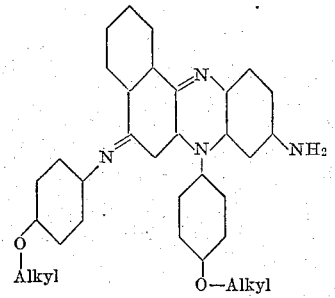

The hydrogen atoms of the amino group attached to the benzene nucleus in the naphthophenazine ring can be replaced by alkyl or aryl radicles and the naphthalene, as well as the benzene rings of the naphthophenazine nucleus can be substituted by sulfo groups, the naphthalene ring preferably in 8 position, or other common substituents.

Our novel dyestuffs are generally dark powders with metallic lustre, they are soluble in water with blue to violet colors, soluble in concentrated sulfuric acid with green colors and dye wool from acid baths very level greenish-blue to violet shades of particularly good fastness to light.

The 1-3-di(p-alkoxyarylamino)naphthalene compounds are easily prepared from 1-naphthylamine-3-sulfonic acid compounds by reacting upon same with 1-amino-4-alkoxy-benzene compounds.

Our invention is further illustrated by the following examples, the parts being by weight, but it is understood, that our invention is not limited to the specific dyestuffs described.

*Example 1.*—450 parts 1-3-di(4'-methoxy-phenylamino)naphthalene-8-sulfonic acid are dissolved in 6000 parts 50% alcohol and neutralized with soda ash; to this a solution of 216 parts 4-amino-dimethylaniline-3-sulfonic acid in 2000 parts 50% alcohol, 53 parts soda ash and 50 parts of a cuprammonium solution corresponding to 20 parts blue vitrol are added; the reaction mass is then heated to 50–60° C. and with stirring a current of air blown through. The dyestuff is completely formed and precipitated after several hours blowing. It is filtered off and if need be recrystallized from hot water. After drying it is obtained as a dark powder having a cuprous lustre, it is soluble in water with a blue and in concentrated sulfuric acid with a green color, it dyes wool level, greenish-blue shades, particularly fast to light.

The dyestuff can be represented by the most probable formula

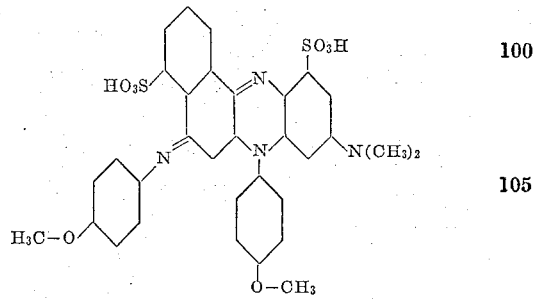

*Example 2.*—530 parts 1-3-di(4'-methoxyphenylamino)naphthalene - 6 - 8 - disulfonic acid are stirred up in 10,000 parts alcohol with 225 parts para-nitroso-dimethylaniline and heated to boiling temperature; the reaction proceeds quickly with the formation of the azine dyestuff. After cooling it is filtered off and is isolated in the usual manner. It is a dark powder having a cuprous lustre, it is soluble in water with a blue color and in concentrated sulfuric acid with a green color and dyes wool level, clear blue shades of good fastness to light. The dyestuff can be represented by the most probable graphical formula

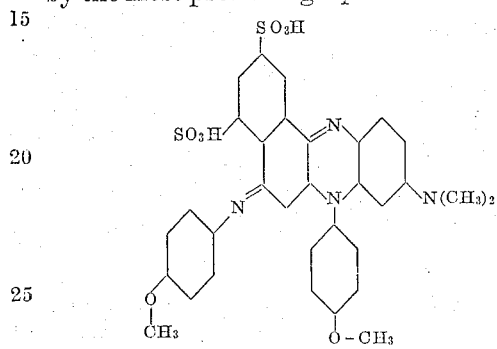

*Example 3.*—The dyestuff of the probable formula

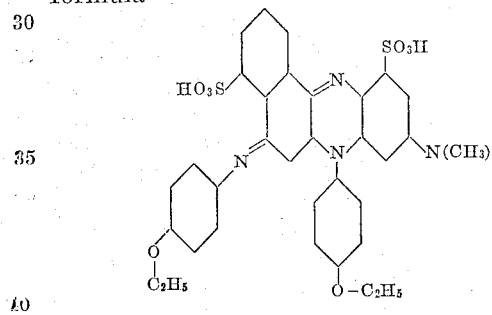

which can be obtained by joint oxidation of 1-3-di(4'-ethoxyphenylamino)naphthalene-8-sulfonic acid and 4-amino-dimethylaniline-3-sulfonic acid is a dark powder with a cuprous lustre, soluble in water with a blue, in concentrated sulfuric acid with a green color and dyes wool level, very greenish-blue shades of excellent fastness to light.

*Example 4.*—By joint oxidation of 1-3-di-(4'-methoxyphenylamino)naphthalene-8-sulfonic acid with p-phenylene-diamine-sulphonic acid a dyestuff is obtained which can be represented by the most probable formula

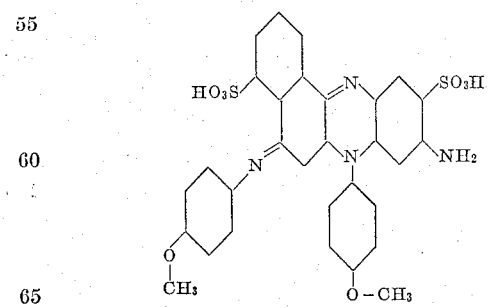

It is a brown powder with a metallic lustre, soluble in water with a violet color, soluble in concentrated sulfuric acid with a green color and dyes wool level, bluish-violet shades of good milling and excellent light fastness.

We claim:—

1. As new products naphthophenazine dyestuffs of the general type

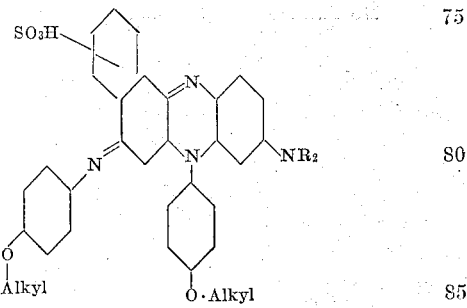

in which R stands for hydrogen, an alkyl or an aryl radicle, and in which the naphthophenazine nucleus may contain additional sulfo groups, which are dark powders with metallic lustre, soluble in water with from violet to blue colors, soluble in concentrated sulfuric acid with a green color, dyeing wool from violet to blue shades, particularly fast to light and which are substantially identical with the products obtainable by submitting 1 - 3 - di(para-alkoxyarylamino)naphthalene compounds and para-diamino-aryl compounds to reactions leading to the formation of the naphthophenazine nucleus.

2. As new products naphthophenazine dyestuffs of the general type

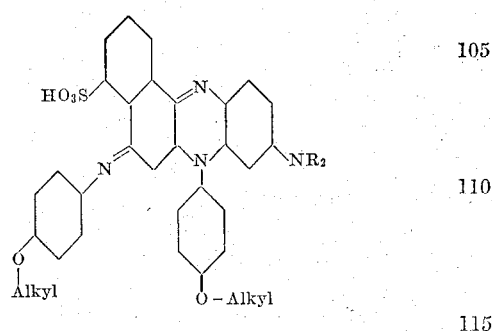

in which R stands for hydrogen, an alkyl or an aryl radicle and in which the naphthophenazine nucleus might be further substituted by sulfo groups, which are dark powders with a metallic lustre, soluble in water with from violet to blue colors, soluble in concentrated sulfuric acid with a green color, dyeing wool from violet to blue level shades particularly fast to light and which are substantially identical with the products obtainable by submitting 1-3-di(para-alkoxyarylamino) naphthaline-8-sulfonic acid compounds and para-diamino-aryl compounds to reactions leading to the formation of the naphthophenazine nucleus.

3. As a new product the naphthophenazine dyestuff having most probably the formula

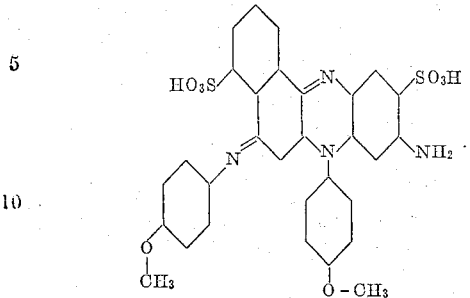

which is a brown powder with metallic lustre, soluble in water with a violet color, soluble in concentrated sulfuric acid with a green color, dyeing wool bluish-violet, level shades of excellent fastness to light and which is substantially identical with the product obtainable by joint oxidation of 1-11-di-(methoxyphenylamino)naphthalene-8-sulfonic acid and para-phenylene-diamine sulfonic acid.

In testimony whereof we have hereunto set our hands.

WILHELM NEELMEIER.
THEODOR NOCKEN.